UNITED STATES PATENT OFFICE.

JONAS W. AYLSWORTH, OF EAST ORANGE, NEW JERSEY, ASSIGNOR TO HALOGEN PRODUCTS COMPANY, OF GLEN RIDGE, NEW JERSEY, A CORPORATION OF NEW JERSEY.

CHLORINATED INSULATING COMPOUND.

1,196,505.      Specification of Letters Patent.      Patented Aug. 29, 1916.

No Drawing.      Application filed November 4, 1913. Serial No. 799,149.

*To all whom it may concern:*

Be it known that I, JONAS W. AYLSWORTH, a citizen of the United States, and residing in East Orange, county of Essex, State of New Jersey, have invented certain new and useful Improvements in Chlorinated Insulating Compounds, of which the following is a description.

My invention relates to the production of a new product which is extremely useful for electrical insulation and other purposes, and which comprises a solid chlorinated naphthalene which has been distilled and rendered stable by the elimination of unstable addition products and other impurities. The distilled products formed by me and considered herein are substitution products of naphthalene in which two or more atoms of chlorin or equivalent halogen have entered into the molecule and these I accordingly will refer to as the "higher" chlorinated or halogenated naphthalenes, in contradistinction to products containing less than two atoms of chlorin or other halogen. These products when treated with a basic oxid, as described herein, and distilled are characterized by complete stability, when heated to temperatures equal to or less than their boiling points, whereas chlorinated products of this character made by well known methods and not treated and distilled are not so characterized. This difference is due to the elimination of loosely-attached or addition compounds by the high temperature of distilling and to the practice of my improved process. Such products made by other methods always contain some addition products, which cause them to evolve hydrochloric acid when melted and heated to a temperature of say 300° F. Hydrochloric acid is a poor dielectric and halogenized naphthalenes containing the same are accordingly of lower value as insulators than the products which have had the addition products eliminated therefrom.

The objects of my invention are accordingly to produce the new product referred to as a composition of matter, and to devise an efficient process for producing the same. The product is formed from the known wax-like solid chloro-naphthalenes, such for example as may be formed by the process described in my Patent No. 914,223, dated March 2, 1909, by distilling the same in the presence of a small percentage of a basic oxid, such as lime, barium oxid or sodium hydrate, or by distillation after heat treatment of the material with a small percentage of one of the alkaline oxids referred to.

So far as I am aware no one prior to myself has distilled the halogenized products referred to and recognized the advantages of the product as an insulating material accruing from so doing. One might naturally expect distillation of these products to result in the decomposition of the same, with even explosive evolution of hydrochloric acid, because of the presence of hydrogen in the molecule of the chloro-naphthalene. The experiments made by me however, show the unexpected result that no decomposition of the chloro-substituted body took place, but that decomposition of the accompanying halogen addition products of naphthalene did take place, with the beneficial results referred to.

It should be noted that sublimation is not sufficient to accomplish the purpose desired herein, and that while some of the higher chlorin naphthalenes sublime at relatively low temperatures, they all require temperatures equal to their boiling points in order that the operation of distillation may be performed. These boiling points are high, some of them being in the neighborhood of 800° F.

In the process of distillation the chlorin addition products, which are to be eliminated, are decomposed with the formation of hydrochloric acid gas and a pitch-like residue, which remains in the retort. When a basic oxid is used, as stated, either during the distillation or in heat treatment of the material preliminary to distillation, the effect of the same is to aid in breaking up the addition products referred to. If the base is used in heat treatment prior to distillation the effect is to largely break up the addition products before distillation, and thus prevent the formation of hydrochloric acid during the distillation. This is an advantage, since thereby the possibility of corrosion of the distilling apparatus, by the hydrochloric acid during the distillation is prevented. It should be remarked that the stills used commercially are of metal, such as iron, and all metals which are practicable for commercial use are corroded by hydrochloric acid solution, although not attacked readily by dry hydrochloric acid gas. Since the preferred method of distillation is with steam, and moisture is present during the distillation in any case, it is evident that the presence of hydrochloric acid in the still during the distillation is to be avoided, as it is in the process described.

The best results, for the formation of an insulating material, can only be obtained, when the treatment with a basic oxid is used in addition to the distillation of the product, as stated. If the substance is merely distilled, without the alkali treatment, the addition products described are partly broken up, as stated, but some part of these unstable bodies may be carried over in the distillation, and these will evolve some hydrochloric acid on subsequent heating of the distilled product. Also, if distillation alone is used, some hydrochloric acid is carried over in the distillation, and it is practically impossible to remove all of the same from the distilled product. The dielectric strength of the product is impaired if the same contains any hydrochloric acid, or unstable impurities, which may decrease the insulation value of the product, either because of their presence, or by the evolution therefrom of small quantities of hydrochloric acid, when the material is subsequently heated.

The amount of basic oxid to be used in the above process depends on the amount of addition products in the composition to be eliminated, which can be ascertained by test. Enough of the base should be added to the compound, if it is to be used, to prevent the formation of hydrochloric acid during the distillation. In practice a small proportion of the base, from 1 to 10 per cent. of the weight of the chlorinated product will be sufficient.

In my patent entitled "Electrical insulators", No. 1,094,829, issued April 28, 1914, I have described and claimed a liquid insulating material comprising liquid mono-chloro-naphthalene which has been distilled and from which solid modifications of the chloro-naphthalene, or higher substitution products thereof, and free naphthalene, if present, have been removed. That product as described in my said patent is a liquid which remains in liquid condition at minus 15 degrees C. The product described herein, on the contrary, is a solid body, comprising a distilled and purified higher chloro-naphthalene, such as tri-, tetra-, penta-, hexa-, hepta- or octa- chloro-naphthalene, or a mixture of the same. As an insulating material this substance has a high value, its dielectric strength and insulation resistance being very good, and in advance of the values determined for the product before distillation, especially when the temperature of the substance is elevated. The value of the distilled product as an insulating material in electrical condensers is especially marked, as is described in my patent entitled "Electrical condensers", No. 1,111,289, granted September 22, 1914. The product is also not easily inflammable, and in some cases is quite non-inflammable.

The product described herein is a purified solid chloro-naphthalene, having a chlorin content at least equal to that of tri-chloro-naphthalene, and usually consisting of a mixture of various chloro-naphthalenes, freed from unstable impurities and hydrochloric acid, and which will not evolve any hydrochloric acid when subsequently heated, as an insulating material often is in practice, to a temperature less than its boiling point.

Having now described my invention what I claim and desire to protect by Letters Patent is:—

1. The process of preparing an insulating composition comprising mixing a small proportion of a basic oxid with a mixture of solid chloro-naphthalenes whose chlorin content is at least equal to tri-chloro-naphthalene, heating the mixture and distilling the same with the consequent elimination of all hydrochloric acid from the composition and the breaking up and elimination of all unstable products from which hydrochloric acid might be evolved by subsequent heating of the composition up to its boiling point, substantially as described.

2. The process of preparing an insulating composition comprising first treating a mixture of chloro-naphthalenes whose chlorin content is at least equal to that of tri-chloro-naphthalene with a small proportion of a basic oxid to break up unstable addition products contained in the said mixture and then distilling the resultant product in the presence of the basic oxid, substantially as described.

This specification signed and witnessed this 3rd day of November, 1913.

JONAS W. AYLSWORTH.

Witnesses:
 DYER SMITH,
 FREDERICK BACHMANN.